United States Patent
Chang et al.

(10) Patent No.: US 8,966,204 B2
(45) Date of Patent: Feb. 24, 2015

(54) DATA MIGRATION BETWEEN MEMORY LOCATIONS

(75) Inventors: Jichuan Chang, Sunnyvale, CA (US); Justin James Meza, Pittsburgh, PA (US); Parthasarathy Ranganathan, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 13/408,276

(22) Filed: Feb. 29, 2012

(65) Prior Publication Data

US 2013/0227218 A1  Aug. 29, 2013

(51) Int. Cl.
*G06F 12/08* (2006.01)
*G06F 12/16* (2006.01)

(52) U.S. Cl.
USPC .... 711/165; 711/118; 711/162; 711/E12.017; 711/E12.103

(58) Field of Classification Search
CPC ...... G06F 3/0647; G06F 3/067; G06F 3/0605
USPC ........... 711/165, 162, 118, E12.017, E12.103
See application file for complete search history.

(56) References Cited

U.S. PATENT DOCUMENTS

| | | | |
|---|---|---|---|
| 6,556,477 B2 | 4/2003 | Hsu et al. | |
| 7,500,050 B2 | 3/2009 | Gill et al. | |
| 2010/0274825 A1 | 10/2010 | Nemoto et al. | |
| 2010/0318734 A1* | 12/2010 | Vaid et al. | 711/113 |
| 2011/0107045 A1 | 5/2011 | Bish et al. | |
| 2011/0138106 A1* | 6/2011 | Prabhakaran et al. | 711/103 |

OTHER PUBLICATIONS

J. Drummler, et al.; "Combining Measures for Temporal and Spatial Locality"; 2006; pp. 697-706; http://www.tu-chemnitz.de/informatik/PI/forschung/pub/download/DRR_pdce06.pdf.

Hu Yiming, et al.; "Rapid-Cache—A Reliable and Inexpensive Write Cache for High Performance Storage Systems"; Feb. 2002; vol. 13; Issue 3; http://www.ele.uri.edu/Research/hpcl/RAPID/IEEE_draft.pdf.

S.H. Noh, et al; "Significance of Write References on Nonvolatile Buffer Cache and Its Implication on Hit Ratio and the Optimal Min Replacement Algorithm"; Mar. 2007; pp. 155-160; vol. 7; Issue 3; http://paper.ijcsns.org/07_book/200703/20070324.pdf.

* cited by examiner

*Primary Examiner* — Yong Choe
(74) *Attorney, Agent, or Firm* — Van Cott, Bagley, Cornwall & McCarthy; Steven L. Nichols

(57) ABSTRACT

Migrating data may include determining to copy a first data block in a first memory location to a second memory location and determining to copy a second data block in the first memory location to the second memory location based on a migration policy.

20 Claims, 6 Drawing Sheets

DATA MIGRATION BETWEEN MEMORY LOCATIONS

BACKGROUND

Hybrid memory generally includes two different memory structures to hold data. One example includes data storage that uses both volatile and non-volatile memory. Non-volatile memory does not require power to maintain the data stored. However, it typically takes longer to write or retrieve data from non-volatile memory as compared with volatile memory.

One example of such hybrid memory includes non-volatile memory and a cache that uses random access memory. Data that is more frequently used is generally stored in the random access memory for quicker retrieval. Less frequently used data is generally stored in the non-volatile storage memory. Storing frequently used data in random access memory allows that data to be accessed more quickly, but also has other benefits such as reduced energy consumption and reduced wear-out due to fewer non-volatile memory writes.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

In the context of hybrid memory, data migrates between different memory structures or devices based on any number of factors, such as how frequently that data is being accessed. Managing this data migration properly optimizes the use of the hybrid memory.

The present specification describes principles including, for example, a method for migrating data. Examples of such a method may include determining to copy a first data block in a first memory location to a second memory location and determining to copy a second data block in the first memory location to the second memory location based on a migration policy.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
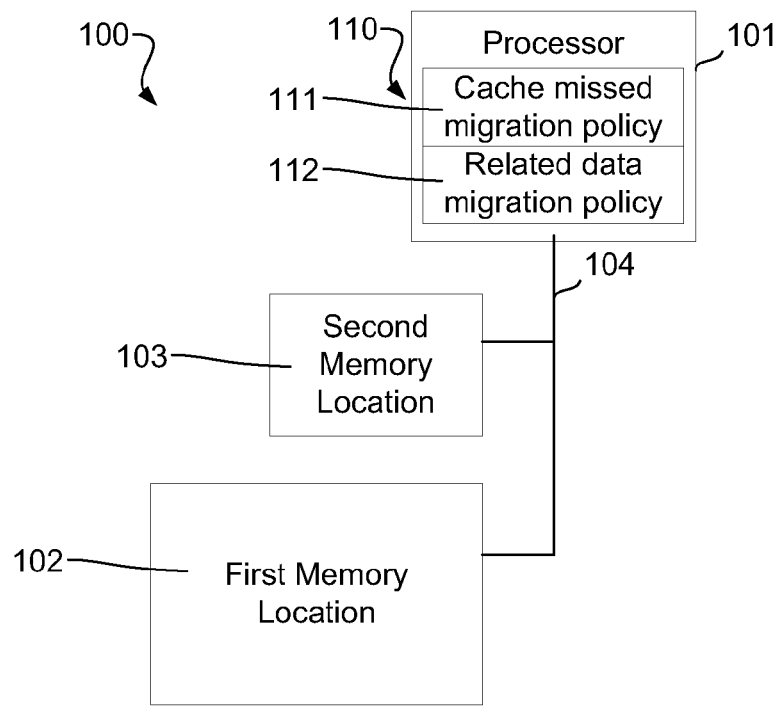
FIG. 1 is a diagram of an illustrative memory system, according to principles described herein.

FIG. 1 is a diagram of an illustrative memory system (100), according to principles described herein. In this example, the system (100) has a processor (101), a first memory location (102), and a second memory location (103).

In some examples, the processor (101) utilizes data stored in either the first or second memory locations (102, 103). In some examples, the first memory location (102) is a non-volatile memory device, while the second memory location (103) is a volatile memory device. Examples of non-volatile memory include, but are not limited to, hard drives, optical discs, and Flash memory devices. In some examples, the first memory location (102) has a slower access time and increased storage capacity than the second memory location (103). The second memory location (103), for example, may be a memory cache, a processor memory cache, an off-chip memory cache, a random access memory cache, or combinations thereof. The memory cache may contain data, executable code, other information, or combinations thereof.

In some examples, the first and second memory locations (102, 103) are part of a memory hybrid system, a memory hierarchy, or combinations thereof. In some examples, the memory locations are part of different devices such as a memory drive inserted into a personal computer. In some examples, the first and second memory locations are located within the same network. In some examples, the processor accesses the first and second memory locations (102, 103) remotely.

In some examples, the processor (101) and the first and at least one of the first and second memory locations (102, 103) are connected by a bus (104). In some examples, the first and/or second memory location may be in wireless communication with the processor (101). In some examples, the memory locations may be memory levels or tiers within a memory hierarchy. In some examples, the memory system comprises a three-dimensional stacked memory architecture.

In some examples, memory is stored in the first and/or second location in a memory matrix made up of rows and columns. In such examples, each datum may be addressable. In some examples, multiple data points are grouped together to form a data block. The data blocks may be sequentially arranged within the memory matrix or portions of the blocks may be spatially disjointed, but read together by a processor.

In the example of FIG. 1, the processor includes a migration policy (110) that governs which data to migrate between memory locations. The data migration may be between the first and second memory locations (102, 103). In some examples, the processor may also include a memory location, and the data migration may be between the first or the second memory locations (102, 103) and the memory location within the processor (101). In other examples, the data migration may be between either of the first or second memory locations (102, 103) and another memory location in a remote device.

A cache miss occurs when a processor requests information from a cache, which in some examples may be the second memory location (103), and the information is not found in the cache. In some examples, the migration policy (110) includes a cache missed migration policy (111) that may determine on a demand basis which data should be migrated based on cache misses. Further, the migration policy (110) may also include a related data migration policy (112) that may determine which data that is related to the cache missed data should also be migrated based on separate considerations than for the cached missed data. Related data may include data that is in the same memory location with the cached missed data, that has a temporal locality with respect to the cached missed data, a spatial locality with respect to the cached missed data, or combinations thereof.

Figure 2:
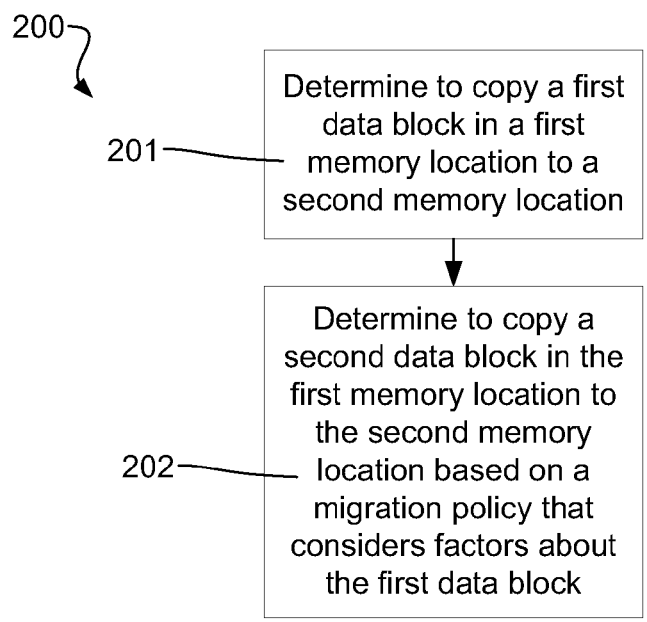
FIG. 2 is a diagram of an illustrative method for migrating data, according to principles described herein.

FIG. 2 is a diagram of an illustrative method (200) for migrating data, according to principles described herein. In this example, the method (200) includes determining (201) to copy a first data block in a first memory location to a second memory location and determining (202) to copy a second data block in the first memory location to the second memory location based on a migration policy.

In some examples, the migration policy may include a spatial locality factor, which may include considering to migrate a data block based on the physical position of that data block within a memory location. In some examples, the migration policy may include a temporal locality factor, which may include determining whether to migrate a data block based on how frequently the data block is used.

The processor may determine to copy or promote a first data block from the first memory location into the second memory location when the processor requests to read the first data block in the second memory location, but fails to find the first data block in the second memory location. In some examples, determining to promote the first data block is governed by the migration policy. In some examples, the migration policy determines whether to migrate the first data block based on a temporal locality factor. Such a temporal locality factor may include a threshold usage amount. For example, the migration policy may provide that a first data block is to be migrated after the block has been read at least five times (or another threshold amount) in the first memory location. In some examples, the threshold amount must be achieved within a specific time period. For example, the migration policy may include a threshold amount of five uses (or another amount) within a day (or other time period).

Once the processor determines to move the first data block, other data blocks within the same memory location may also be considered for migration. Different memory blocks in the same memory location may contain information related to the information in the first data block. Such related information may be useful to promote together because the processor may have a higher likelihood of requesting the related information if the processor is already requesting information in the first data block.

The migration policy for promoting the second data block that may contain related information may be a different policy than the policy for determining whether to migrate the first data block. This policy may consider a relationship between the first data block and the second data block. For example, the migration policy for promoting the second data block may consider just a temporal locality relationship, just a spatial locality relationship, or combinations thereof. For example, after determining to migrate the first data block, the migration policy may determine if any other blocks should be migrated with the first data block. In some examples, the policy may result in no other data blocks being promoted, just one other data block being promoted, several other data blocks being promoted, or a significant amount of data blocks being promoted depending on the migration policy for promoting data blocks containing related data. In some examples, the number of other data blocks that get promoted differs depending on the physical position or usage frequency of the first data block.

A spatial based migration policy may include migrating those data blocks that are located within a close spatial proximity to the first data block. In other examples, a spatial based migration policy may include just migrating frequently used data blocks within the spatial proximity of the first data block, just migrating blocks that are in predetermined positions to be migrated with the first data block, other spatial policies, or combinations thereof.

A temporal based migration policy may include migrating those data blocks that are historically used within a short time period of the first data block's usage. In some examples, the first data block is migrated based on a usage frequency threshold and the other blocks to be considered for migration with the first data block may be migrated if they are used often within a short time period of the first data block's usage.

Figure 3:
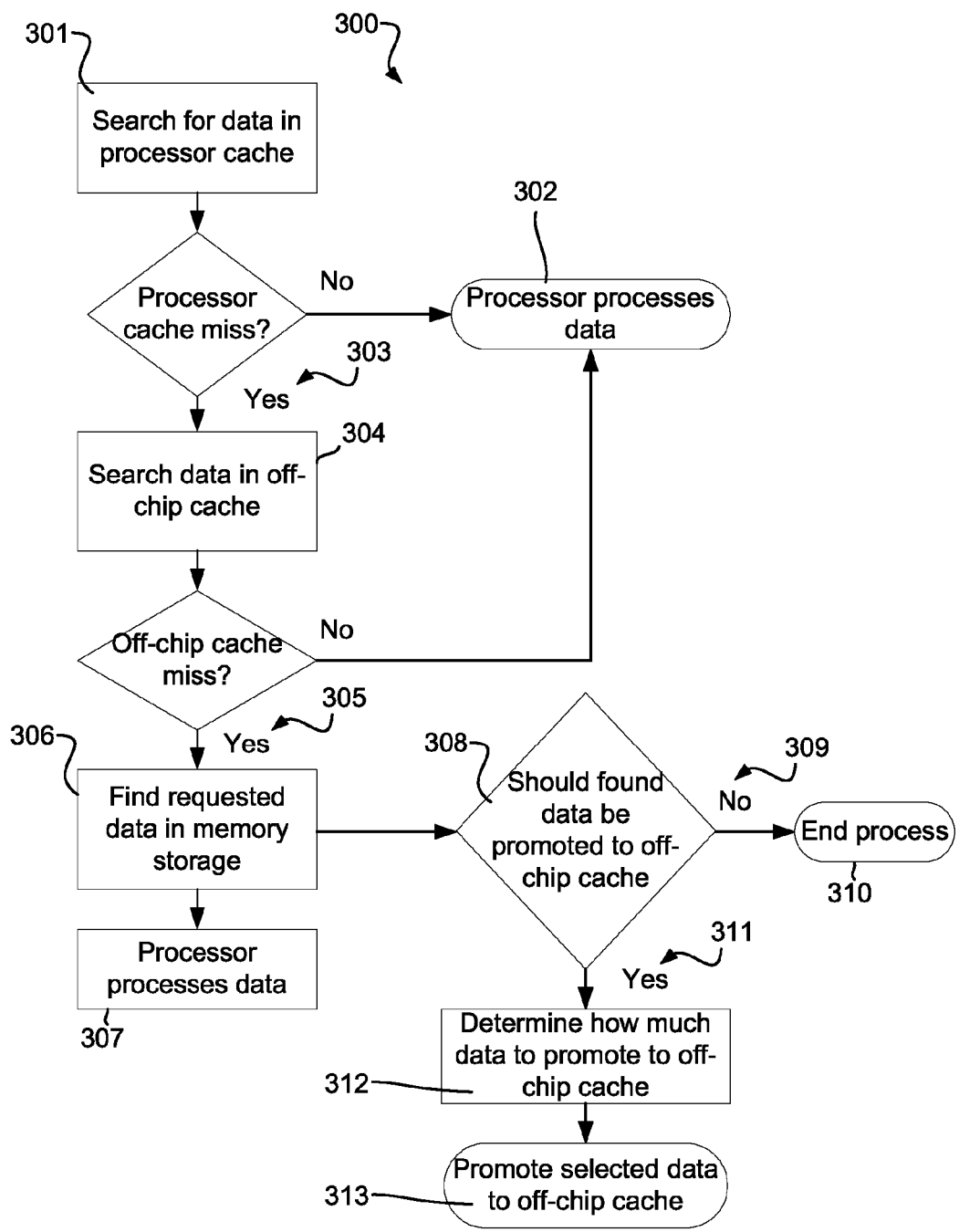
FIG. 3 is a diagram of an illustrative flowchart for migrating data, according to principles described herein.

FIG. 3 is a diagram of an illustrative flowchart (300) for migrating data, according to principles described herein. In this example, a processor searches (301) for data in its processor cache. If the data is found in the processor cache, then the processor may process (302) the data. However, if the data is not on the processor cache and a processor cache miss is reported (303), then the processor may search (304) for the data in a memory cache located outside the processor.

If the data is found on the off-chip memory cache, then the processor processes (302) the data. However, if another cache miss is reported (305), the processor may find (306) the desired data in slower memory storage. After the data is found, the processor may process (307) the data and also determine if the found data should be promoted (308) to the first off-chip memory cache. If the processor determines that the data should not be promoted (309), the process may end (310). However, if the processor determines that the data should be promoted (311), the processor may also determine (312) how much other data from the memory storage should be promoted. Once determined, the processor may promote (313) the requested data and the other related data together.

The processor may determine to copy the found data to the processor cache, the off-chip memory cache, another cache, or combinations thereof. In some examples, the found data remains in the memory storage and the processor merely copies the data from the memory storage to the desired cache.

Figure 4:
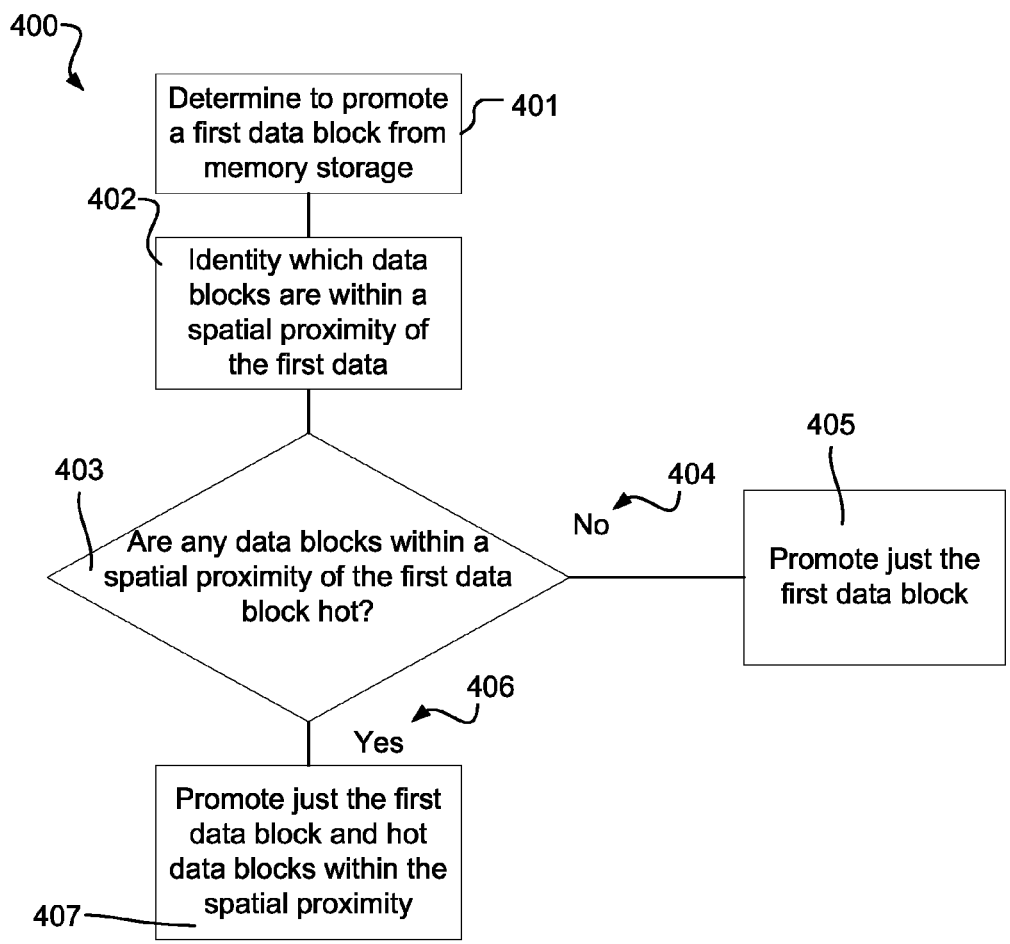
FIG. 4 is a diagram of an illustrative flowchart for migrating data, according to principles described herein.

FIG. 4 is a diagram of an illustrative flowchart (400) for migrating data, according to principles described herein. In this example, a first data block is determined (401) to be promoted from memory storage. To determine which other blocks should be promoted with the first data block, other data blocks within a spatial proximity of the first data block are identified (402). A spatial proximity of the first data block may be any data on a common page with the first data block, in a common row with the first data block, in a common column with the first data block, within a predetermined number of rows of the first data block, within a predetermined number of columns of the first data block, within other spatial boundaries, or combinations thereof.

Out of the blocks that are identified to be within the spatial proximity of the first data block, hot blocks may be identified (403). A hot block is a block that is frequently used as opposed to cold blocks, which have not been used enough to be considered hot. A frequency threshold may be used to determine which blocks are hot and which are cold. Such a frequency threshold may be determined by the processor and/or the migration policy. If no hot blocks are found (404), just the first data block may be promoted (405). On the other hand, if one or more hot blocks are identified (406), then the first data block and the hot blocks may be promoted together (407).

In the example of FIG. 4, both a spatial locality factor, such as identifying the blocks within a spatial proximity of the first data block, and a temporal locality factor, such as which blocks were frequently used, are both incorporated into the migration policy.

In some examples, the frequency threshold amount is variable depending on the circumstances of the system. For example, if a cache has lots of available space or is filled with data that is infrequently used, the promotion frequency threshold may be lower. However, as the space on the cache fills up, or as less frequently used data in the cache is replaced with more frequently used data, the promotion frequency threshold may increase. In other examples, the frequency threshold is lower for certain types of information, such as information that is tied to a high priority project.

Figure 5:
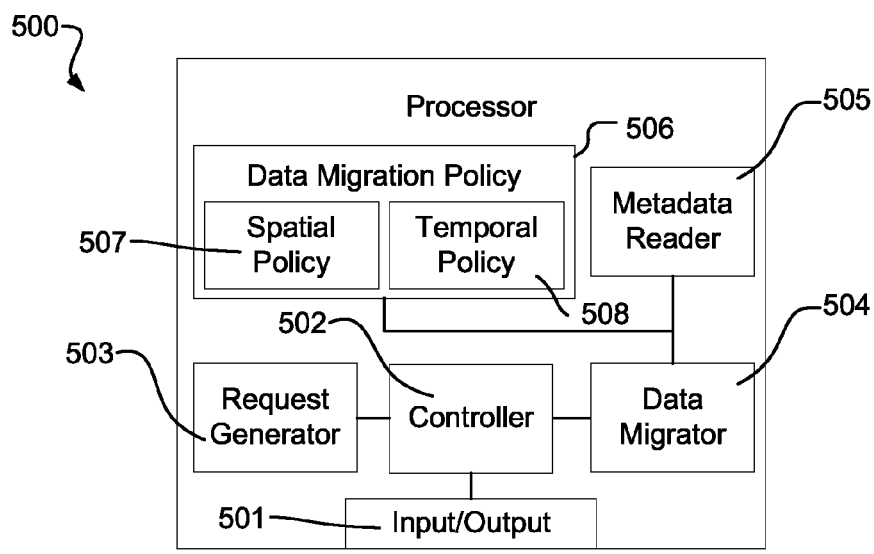
FIG. 5 is a diagram of an illustrative processor, according to principles described herein.

FIG. 5 is a diagram of an illustrative processor (500), according to principles described herein. In this example, the processor (500) has a controller (502) in communication with an input/output (501). The processor (500) may be in communication with other memory locations that store data through the input/output (501). In some examples, the input/output (501) is hard wired to a bus in communication with the memory locations, or in other examples, the input/output (501) is in wireless communication with the memory locations.

The processor (500) may also have a request generator (503), that may be used to make requests of devices outside of the processor. For example, the request generator (503) may make a request to find data that is in an off-chip memory cache. In some examples, if the data is not found in the off-chip memory cache, the request generator (503) sends the request to another cache. If another cache miss is received, the processor may instruct for the data to be found in other caches. If no such cache contains the information sought, the request generator may request for the information to be searched within slower memory storage. In some examples, where the processor knows that the information would not be in a cache (or least have a low probability of being in a cache), the processor may instruct for memory storage to be searched earlier in the process.

The processor (500) may also have a data migrator (504), that may be responsible for migrating data from one memory location to another. The data migrator (504) may be in communication with the migration policy (506) and a metadata reader (505). The migration policy may have a spatial policy (507) and a temporal policy (508).

In some examples, the memory locations store metadata about the data within their locations. In such an example, the metadata reader (505) may read the metadata to determine if blocks identified within the metadata should be promoted based on the migration policy.

In some examples, the migration policy (506) just uses a spatial policy (507). In other examples, the migration policy (506) just uses a temporal policy (508). Further, the processor may contain other components such as its own memory cache, counters, registers, or combinations thereof.

Figure 6:
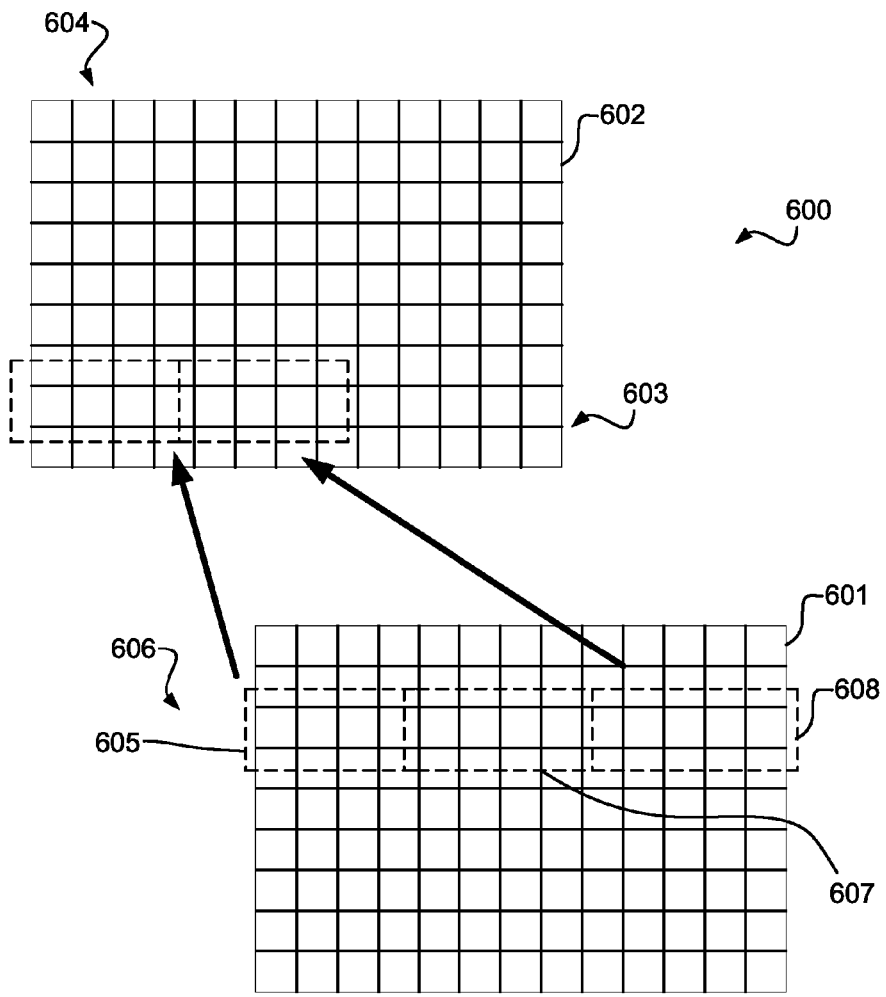
FIG. 6 is a diagram of an illustrative memory structure, according to principles described herein.

FIG. 6 is a diagram of an illustrative memory structure (600), according to principles described herein. In this example, the structure includes a first memory level (601) and a second memory level (602). Each memory level (601, 602) may be memory matrix array, which each datum having a unique physical position and address. The matrix may have a plurality of rows (603) and a plurality of columns (604). Either of the memory levels may be random access memory, volatile memory, non-volatile memory, static random access memory, dynamic random access memory, flash memory, virtual memory, main memory, remote memory, physical memory, read only memory, or combinations thereof.

In the example of FIG. 6, a first data block (605) from the first memory location (601) is being promoted to the second memory location (602). In this example, a migration policy calls for considering whether to migrate the other data blocks within the same row (606) as the first data block. Row (606) may have three different data blocks (605, 607, 608). Thus, both blocks (607, 608) may be considered for possible migration with the first block (605).

The system may use a temporal consideration to determine whether these blocks (607, 608) should be migrated. The temporal consideration may include a usage threshold. In this example, block (608) meets the usage threshold and is, therefore, migrated with the first block (605). On the other hand, block (607) may be considered a cold block for failing to be used enough to meet the threshold and be migrated. Thus, the system may skip block (607) and preserve the bandwidth that it might have otherwise used to migrate it.

While blocks (605, 608) were spatially separated in the first memory level (601), these blocks (605, 608) may be written to the second memory level (602) closer to one another or they may be written wherever most convenient in the second memory level (602). In some examples, the blocks (605, 608) are written over existing data within the second memory level (602). However, all the data in the second memory level (602) may also be stored in the first memory level (601). Further migrated data blocks (605, 608) may continue to remain in the first memory level (601).

The first memory level may have a slower access time, but may be able to store a lot of information inexpensively. On the other hand, the memory in the second level (602) may have a faster access time and be more energy consuming and/or more expensive. Thus, the system may copy just the needed information from the slower, first memory and store it in the faster, second memory to save costs as well as speed up the memory overall.

The data blocks may have a fine granularity such that information in the memory levels is stored in relatively small groups. In some examples, a fine grain data block may be smaller than a page, a matrix row, a matrix column, a hundred kilobytes, ten kilobytes, a kilobyte, or combinations thereof.

Because the system may migrate just those relatively small data blocks that are hot, the system may save area on the second memory level, save overhead due to the reduce amount of data migrated, be more energy efficient, save time, or combinations thereof.

Figure 7:
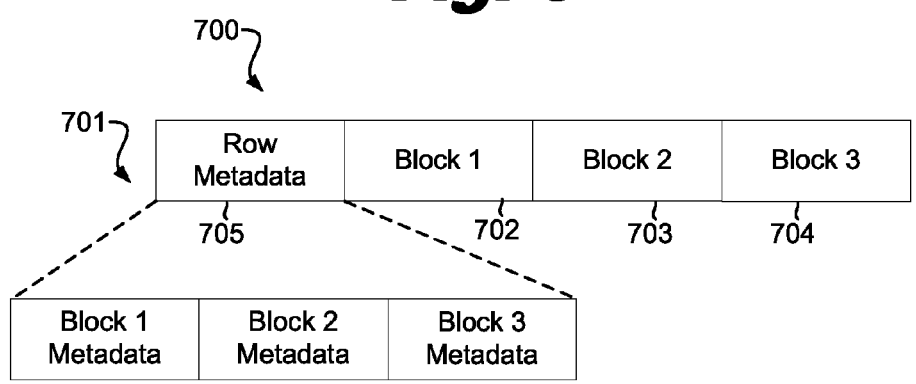
FIG. 7 is a diagram of an illustrative memory structure, according to principles described herein.

FIG. 7 is a diagram of an illustrative memory structure (700), according to principles described herein. In this example, a row (701) of a memory matrix has a first, second, and third block (702, 703, 704) and metadata (705) about the blocks (702, 703, 704). In this example, the metadata is stored in the same level with the information that it describes. In other examples, the metadata is stored in other memory levels or structures, such as a cache or the processor. While the metadata is illustrated as being stored in the same row with the information that it describes, the metadata according to the principles described herein may be located anywhere in or out of the system.

In this example, the metadata (705) has usage statistics about each block (702, 703, 704) in the row (701). For example, the metadata (705) may show the times and the frequency that each block is referenced. These statistics may be used by the system to determine, according to the migration policies, which data should be migrated. In some examples, statistics may be stored in the same memory location with the data that it is describing or the statistics may be stored in other locations or other areas within the same location.

The metadata (705) may be updated as the data is referenced. Further, some of the data in the first memory location may also be located in the second memory location, cache, processor, other location, or combinations thereof. In such examples, the metadata may reflect that this data is cached and how often and when the copied metadata is referenced. In some examples, the metadata is temporarily stored in the cache or other location, and the metadata in the first memory location is batch updated on some kind of basis to save resources.

The migration policy may strive to predict which data within the first memory storage should be migrated with the first data block. Often, a data block that is close to the first data block spatially or temporally has a greater likelihood of being reused if the first data block is reused. Further, the migration policy may also strive to reduce migration overhead, such as bandwidth, energy, computing processing, other overhead resources, and combinations thereof. According to the principles described herein, just the hot data blocks that the processor references may be migrated into the second memory location; thus, the system's migration policy may be a demand based migration policy. As a consequence, the amount of data that is migrated may be customized to meet the needs of the processor, application, project, or combinations thereof. These aims may be achieved through a combination of temporal and spatial locality considerations.

In some examples, the system has a dynamic migration policy. For example, the migration policy may include procedures to experiment with different migration approaches. The migration policy may initially apply a particular migration procedure based on a spatial consideration, but for just a selected group of data, the migration policy may apply different procedures based on similar or different considerations. As these similar or different consideration are applied, the system may compare the amount of overhead used between the applied procedures to determine whether the varied procedures reduced overhead while still accurately predicting the data that has the highest likelihood of being reused.

Through this process, the processor may modify the migration policy to further improve the migration policy's effectiveness. In this manner, the migration policy may be customized to achieve better predictability and/or reduce overhead based on the user, the equipment into which the memory storage system is incorporated, the tasks that the system executes, other factors, or combinations thereof. The system may change the migration policy for either migrating the first or related data blocks. In some examples, the similar or different migration procedures may be applied on a random, periodic, or task related basis.

A processor may also use a different migration policy for migrating data from specific memory locations, to specific memory locations, for specific types of data, for specific types of tasks, for data used by specific threads/processes, other specific factors, or combinations thereof.

Figure 8:
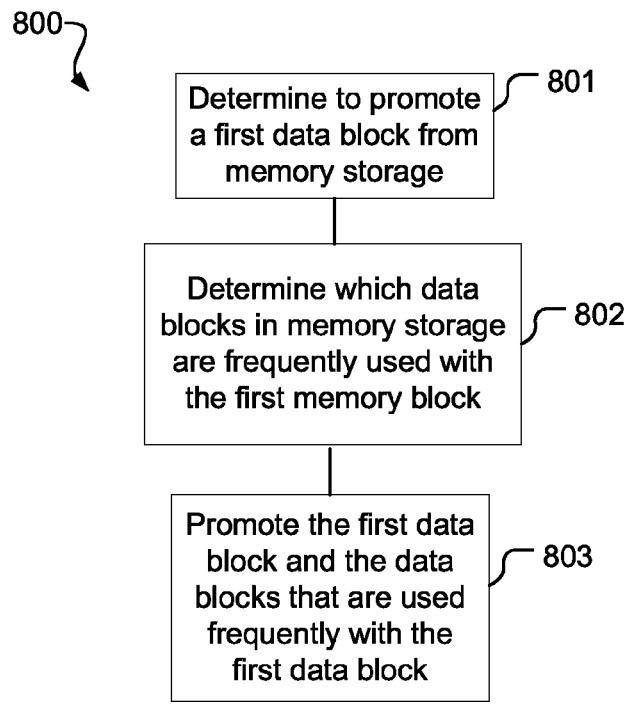
FIG. 8 is a diagram of an illustrative method for migrating data, according to principles described herein.

FIG. 8 is a diagram of an illustrative method (800) for migrating data, according to principles described herein. In this example, the method includes determining (801) to promote a first data block from memory storage, determining (802) which data blocks in the memory storage are frequently used with the first memory block, and promoting (803) the first data block and the data blocks that are used frequently used with the first data block.

In this example, the policy for migrating both the first and the second data blocks are based on just temporal locality considerations.

Figure 9:
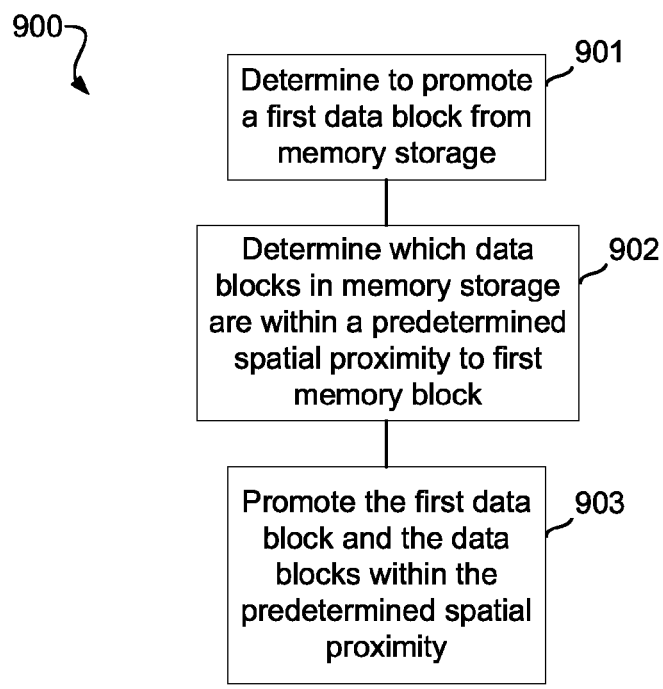
FIG. 9 is a diagram of an illustrative method for migrating data, according to principles described herein.

FIG. 9 is a diagram of an illustrative method (900) for migrating data, according to principles described herein. In this example, the method includes determining (901) to promote a first data block from memory storage, determining (902) which data blocks in the memory storage are within a predetermined spatial proximity of the first memory block, and promoting (903) the first data block and the data blocks within the predetermined spatial proximity.

In this example, the first data block is determined to be migrated based on just a temporal migration policy, and the second data block is determined to be migrated based on just a spatial migration policy.

Figure 10:
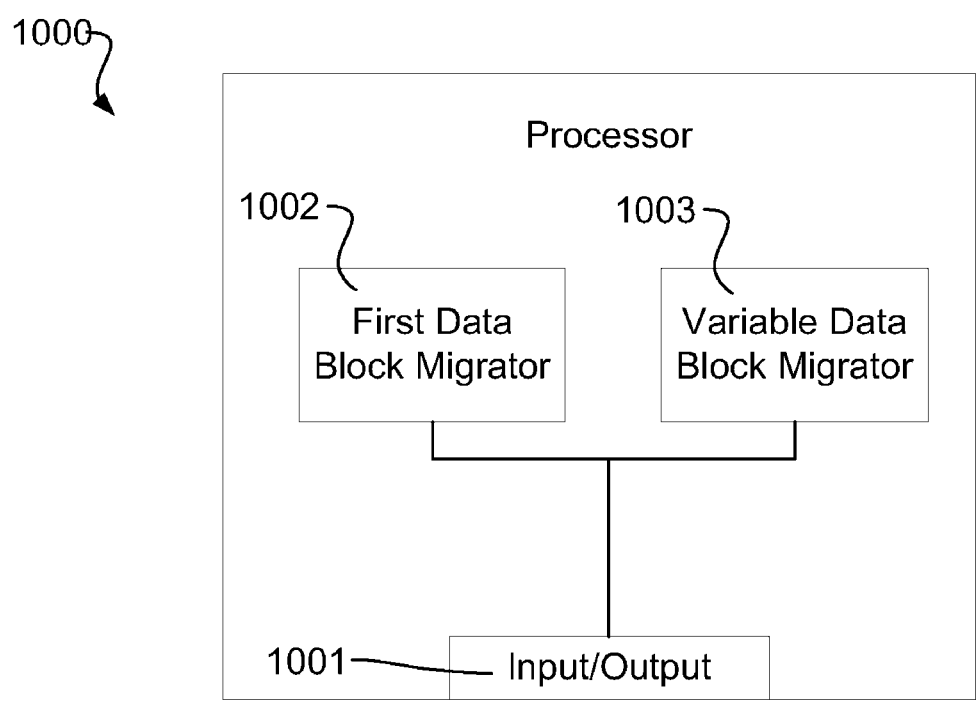
FIG. 10 is a diagram of an illustrative processor, according to principles described herein.

FIG. 10 is a diagram of an illustrative processor (1000), according to principles described herein. In this example, the processor (1000) has an input/output (1001) to send and receive information and/or requests. The processor has a first data block migrator (1002) and a variable data block migrator (1003).

The first data block migrator (1002) may determine whether a first data block from a first location should be migrated. The variable data block migrator may determine which other blocks in the first location should be migrated, if any, when the first data block is migrated. The migrators (1002, 1003) may use separate migration policies to determine whether a data block should be migrated.

The variable block data migrator (1003) may determine which and how many blocks to migrate based on a temporal migration policy, a spatial migration policy, or combinations thereof.

While the migration policies have been described in particular ways, any migration policy according to the principles described herein may be used. Such migration policies may include temporal considerations, spatial considerations, or combinations thereof. Further, the principles described herein include any method, system, product, or apparatus that uses a first migration policy to determine which first data blocks should be migrated and a second migration policy that governs which related data blocks should be migrated with the first data blocks.

The system for migrating data may be incorporated into any system or device that uses memory. A non-exhaustive list of such systems or devices may include servers, desktops, laptop, electronic tablets, mobile devices, phones, cameras, watches, personal computers, instruments, electronic devices, networks, portable memory devices, other devices, or combinations thereof.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for migrating data, comprising:
   determining to copy as first data block in a first memory location to a second memory location;
   determining to copy a second data block in said first memory location to said second memory location with the first data block, the determining to copy the second data block is based on a migration policy that considers a relationship said first data block has with said second data block at the time the first data block and the second data block are stored at said first memory location.

2. The method of claim 1, wherein said data migration policy considers a spatial locality relationship.

3. The method of claim 1, wherein said data migration policy considers a temporal locality relationship.

4. The method of claim 1, wherein the determining to copy the second data block includes reading metadata about said second data block.

5. The method of claim 1, wherein said first memory location comprises non-volatile memory.

6. The method of claim 1, wherein said first memory location comprises a memory structure that supports fine grained data blocks.

7. The method of claim 1, wherein determining to copy a first data block in a first memory location to a second memory location includes failing to read said first data block in said second memory location and determining to copy said first data block based on a temporal locality factor.

8. The method of claim 1, wherein said second memory location is a memory cache.

9. A system, comprising:
a first memory level and a second memory level in communication with a processor;
said processor being programmed to:
promote a first data block from said first memory level to said second memory level; and
determine a variable number of data blocks in said first memory level to promote with said first data block, the determination based on a migration policy that considers a relationship that the variable number of data blocks have with the first data block when at the second memory level.

10. The system of claim 9, wherein said first memory level comprises a slower access time than said second memory level.

11. The system of claim 9, wherein said migration policy is a spatial based migration policy.

12. The system of claim 9, wherein said migration policy is a temporal based migration policy.

13. The system of claim 9, wherein said first data level comprises metadata about said variable number of data blocks.

14. The system of claim 9, wherein said first level comprises a memory structure that supports fine grained data blocks.

15. A computer program product, comprising:
a non transitory computer readable storage medium, said computer readable storage medium comprising computer readable program code embodied therewith, said computer readable program code comprising:
computer readable program code to migrate a first data block in a first memory location to a second memory location; and
computer readable program code to migrate, based on a migration policy, a variable number of data blocks in said first memory location with said first data block, in which the migration policy considers a relationship the said first data block has with said variable number of data blocks at the time the first data block and variable number of data blocks are stored at said first memory location.

16. The computer program product of claim 15, in which the migration policy comprises a temporal migration policy, a spatial migration policy, or combinations thereof.

17. The computer program product of claim 15, wherein said first memory location comprises a memory structure that supports fine grained data blocks.

18. The computer program product of claim 15, wherein said first memory location comprises metadata about said variable number of data blocks.

19. The computer program product of claim 15, wherein said first memory location comprises a slower access time than said second memory location.

20. The computer program product of claim 15, wherein said second memory location is a memory cache.

* * * * *